United States Patent [19]
Ballinger

[11] 3,893,222
[45] July 8, 1975

[54] WELDING

[75] Inventor: Hugh Anthony Ballinger, Abingdon, England

[73] Assignee: United Kingdom Atomic Energy Authority, London, England

[22] Filed: July 25, 1973

[21] Appl. No.: 382,299

[30] Foreign Application Priority Data
July 26, 1972 United Kingdom.............. 34952/72
Nov. 17, 1972 United Kingdom.............. 53384/72

[52] U.S. Cl. ................. 228/107; 228/108; 228/109
[51] Int. Cl. ........................................... B23k 27/00
[58] Field of Search............ 29/421 E, 470.1, 470.2, 29/479, 497.5; 72/56; 228/3

[56] References Cited
UNITED STATES PATENTS

3,290,770  12/1966  Silverman et al................. 29/523 X
3,761,004  9/1973  Hanson et al.......................... 228/3

Primary Examiner—Gerald A. Dost
Attorney, Agent, or Firm—Larson, Taylor and Hinds

[57] ABSTRACT

A method and apparatus for use in explosive welding of two components. The apparatus comprises an anvil for supporting the components during the explosion which is free to be accelerated away from the components, after the explosion has terminated, by the stored strain energy in the anvil. The anvil is so shaped and dimensioned that the compressive shock waves may travel from the interface between the components and the anvil to a free surface, and the resulting rarefraction shock waves may travel back to the interface in a time not less than it takes for the explosion to take place.

28 Claims, 16 Drawing Figures

WELDING

This invention relates to the joining of materials by explosive welding and in particular, although not exclusively to the explosive welding of metal pipes.

Explosive welding is an attractive form of joining pipes either underwater or on land. There is an increasing need to effect welding of pipes underwater, because the uses of underwater pipes for conveying oil, natural gas, services such as communications, sewers, drainage, and many other uses, are increasing.

In the explosive welding process for joining two components; a part of one component, the "flyer," is spaced away from the other component, the "target," and accelerated by an explosive charge until it impacts and welds with the target. During this process the target is supported on its other face over the area of impact by an anvil sometimes called a clamp, die or a backing member.

In the past one form of explosive welding has been to form a lap or scarf joint between the ends of two pipes to be joined, the explosive charge is placed around the outside of the joint and an anvil is located in the bores of the pipes in the vicinity of the joint to prevent the pipes from collapsing. One of the main difficulties encountered with this form of explosive welding is the removal of the internal anvil after the weld has been completed. It is conceivable that the internal anvil could be fabricated as a hollow sleeve which forms part of the completed joint (i.e. it is not subsequently removed) but even so, an obstruction remains in the bore of the pipe after the weld is completed. To overcome these difficulties a further proposal in the past resided in placing the explosive charge inside the ends of two butt jointed pipes, and expanding the pipes outwardly to explosively weld them to the bore of a sleeve assembled around the pipes. The sleeve forms a part of the completed joint.

In this latter proposal it is customary to use an external anvil which is securely assembled around the outside of the sleeve to absorb the energy expended by the explosion, and after the weld has been completed the anvil is removed from the pipes. It is usual to construct this anvil as a single annular member, or to construct it from a number of parts which are securely bolted together to form effectively a single annular member. The anvil is split to enable it to be assembled around, or disassembled from, the pipes to be joined. For the purposes of supporting the pipes during the explosive welding, the split anvil can be regarded as being a massive, substantially fixed, solid inertial support, the purpose of which is to resist, with minimal movement, the affects of the explosion, and it remains in place around the pipes at all times until it is unbolted.

Various forms of anvil have been tried in the past and the principal criterion applied has been that of providing the largest mass that is practically possible to resist the explosion.

Most prior known proposals have attempted to convert the energy from the explosion into strain energy by straining the anvil and/or the bolts, or clamps holding the anvil together and, because some of the energy of these systems is expended in deforming the anvil plastically, the anvils are usually too badly damaged and cannot be used for large numbers of welding operations.

Contrary to known prior proposals the present invention does not rely on the anvil being securely clamped to one of the components being welded, and the present invention stems from the analysis, by the present inventor, of the propagation and the effect of the resulting shock waves travelling through the anvil. The present inventor has appreciated that, unlike the prior known treatment of the problems of explosive welding, the main function of the anvil is not solely one of providing the maximum inertial resistance to the explosion, but that the shock wave which is propagated must be considered, and since it cannot be eliminated, its detrimental effect on the welding process must be catered for. In other words the functions of the anvil are twofold. Firstly, it must act as an inertial support, remaining in contact with the target during the welding process. Secondly, it must reduce subsequent distortion of the welded components by absorbing any free residual energy as the weld is completed.

According to the present invention there is provided a method of welding a first component to a second component by accelerating it towards, and impacting it into, the second component by detonating an explosive charge adjacent the first component comprising the step of positioning, adjacent the side of the second component that is remote from the first component an anvil which is so shaped and dimensioned that it supports the second component against the forces generated by the explosion, and, thereafter, is accelerated away from the second component by the stored energy in the anvil.

The present invention also provides apparatus for use in a method of welding a first component to a second component by accelerating at least a part of the first component towards, and impacting it into, the second component by detonating an explosive charge adjacent the first component, comprising an anvil for location adjacent the side of the second component that is remote from the first component, the anvil being so shaped and dimensioned that it remains to support the second component throughout the duration of the explosion against the forces generated by the explosion, and thereafter is caused to be accelerated away from the second component by the stored strain energy in the anvil.

According to a further aspect there is provided Apparatus for use in a method of explosive welding of components comprising an anvil made of a plurality of separable members for assembly in contact with the components to be welded, and temporary constraining means for ensuring that the members remain to support the components throughout the explosion but which permits the members to be accelerated away from the components by the stored strain energy in the members after the explosion has terminated.

Preferably the anvil is constructed so that it has a dimension ($r$) from the interface between the anvil and the second component to a free surface of the anvil, measured in the direction extending away from the explosive charge which is sufficient to enable compression shock waves produced by detonating the explosive charge to travel from the interface to the free surface through the anvil and for resulting rarefraction shock waves reflected from the free surface to travel back through the anvil to the interface in a time not less than it takes for the explosion to take place. This dimension ($r$) is approximated by the formula.

$$r = \frac{x}{2} \cdot \frac{V_s}{U_1}$$

where
$x$ is the maximum distance between the first and second component immediately prior to detonation of the explosive charge; $V_s$ is the velocity of sound through the anvil; and $U_1$ is the mean velocity of that part of the first component that is accelerated towards the second component prior to it impacting with the second component.

In the method of welding of the present invention the energy stored as strain energy by the anvil appears as kinetic energy as, in order to perform its second function, the anvil departs from the target when the impact ceases as will be explained in greater detail hereinafter.

In practice the anvil will be designed to allow the complete propagation of the compression and rarefraction shock waves through the anvil and this will dictate the dimensions of the anvil; this in turn will determine the value of the mass of the anvil. However, the mass of the anvil should be kept minimal because otherwise residual energy stored in the weld may damage the weld.

For welding pipes, the anvil is assembled around the outside of the pipes in the region of the join and the explosive placed inside the pipes. The anvil may be a segmented annular member and the segments may be loosely restrained simply to hold the anvil in the correct place whilst the explosion is taking place, thereafter, the segments are allowed to fly away from the weld and are subsequently retrieved for the next time a weld is to be effected.

The anvil or each segment of the anvil may be made of two abutting parts (hereinafter called the first and second parts respectively) which are assembled in series proceeding away from the explosive charge. The first and second parts are arranged together such that the compression shock wave traverses the join between the two parts and continues until it reaches the free surface of the anvil (i.e. the free surface of the second part which is furtherest from the explosion) whereupon the resulting rarefraction shock wave reflected from this free surface travels back to the interface between the first and second parts causing the second part to separate from the first part of the anvil and fly away thereby converting absorbed energy into kinetic energy. Upon this happening, the continuing compression wave in the first part of the anvil due to the continuing explosion is reflected as a rarefraction shock wave from a new free surface, which was the join between the first and second parts of the anvil. This somewhat reduced rarefraction shock wave travels back to the interface between the second component and the first part of the anvil and causes the first part of the anvil to separate from the second component.

More than two parts could be used to make up the anvil in which case the propagation of the compression wave and the rarefraction shock waves in respect of each part would be much the same as that just mentioned. Each time that a rarefraction shock wave encounters a join between two parts, that part furtherest from the explosion would separate taking away some of the total energy of the system, and presenting a "new" free surface for the remaining compression wave to reflect from as a rarefraction wave. This would progress until the anvil is completely separated from the components being welded, but in any case separation of the whole anvil (i.e. all of the parts which make up the anvil) from the components being welded must not occur before the explosion finishes.

In yet a further modification, an anvil or each part or segment of such an anvil, may be provided with further braking means, for example a further mass located in the path of the accelerated part as it flies away from the explosion in order that it may collide with the further braking means. Additional braking masses may be located in the path of flight of the combined anvil, or segment or part of anvil, and the first encountered braking mass.

Instead of using masses, the braking means may be hydraulic, pneumatic, or elastic or plastic deformation means or other recoil mechanisms which absorb the energy of the flying parts.

In yet a further aspect the present invention provides apparatus for welding a first component to a second component by accelerating at least a part of the first component towards, and impacting it into, the second component which apparatus comprising explosive means for positioning adjacent the first component, an anvil for positioning in contact with the second component on that side of the second component that is remote from the first component, and temporary constraining means for supporting the anvil in contact with the second component but which allows the anvil to be accelerated away from the second component by the stored strain energy in the anvil after the explosion has terminated, the anvil comprising one or more members which have a first surface for contacting the second component and a free surface spaced from the first surface by a minimum distance which is sufficient to enable compression shock waves produced by the explosion to travel from the first surface to the free surface through the member and for resulting rarefraction shock waves reflected from the free surface to travel back through the member to the first surface in a time not less than it takes for the explosion to take place.

In yet a further aspect of the present invention there is provided a method of welding pipes in a liquid environment comprising the steps of positioning the pipes relative to each other to enable them either to be welded together or to be welded to a common external collar, locating an explosive charge inside the bore of at least one of the pipes, temporarily sealing the region to be welded and the bores of the pipes so as to reduce the ingression of the liquid into the bores of the pipe in the vicinity of the explosive charge, removing the liquid, if any at least from the regions between each pipe or between the pipes and the collar, assembling around the outside of the pipes a solid annular member which is madee of a number of segments which extend radially a dimension ($r$) which is sufficient to enable compression shock waves produced by detonating the explosive charge to travel from the interface between the anvil and the pipes, or collar, to the outer free surface of the anvil through the segment and for a resulting rarefraction shock waves reflected from the free surface to travel back through the segment to the interface in a time not less than it takes for the burning of the explosive charge to take place constraining the anvil to remain around the pipes by means of a temporary constraining means which allows the anvil to be accelerated away from the pipes by the stored strain energy of the anvil after the explosive charged has burned, and detonating the explosive charge to effect welding either between each pipe or between the pipes and the collar. The seals may be inflatable air bags.

The present invention, applied to the welding of pipes under water will now be described, by way of an example only, with referennce to the accompanying drawings in which.

Whilst the following description is related to the welding of pipes, it should be understood that in general the present invention may be employed for the welding together of any shape of components (which need not be tubular) which are suitable for explosive welding. Furthermore the welding need not take place in water but may take place in air, or in other gases, or liquids. Some of the main differences in welding in other environments or media to that to be described, is that of compatibility of the environment with the explosive being used, and with the materials to be joined; corrosion due to trapped media, the ability to make successful corrosion free welds; and the distance that the anvil or parts of the anvil will fly compared to the distances in water.

Figure 1:
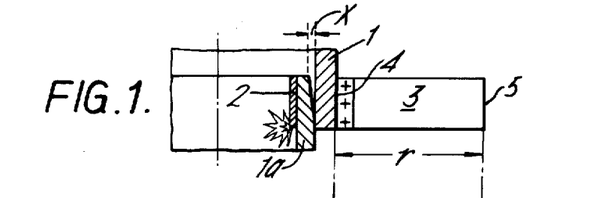
FIGS. 1 to 6 illustrate the general principle of operation of the present invention.

Referring to FIGS. 1 to 6, and in particular to FIG. 1, there is shown, schematically, a part cross sectional view of a lap joint to be welded underwater between a first component, pipe $1a$, and a second component, pipe 1. From FIG. 1 it will be seen that an end part of the pipe $1a$ is initially spaced away from pipe 1. An explosive charge 2 is positioned in the bore of pipe $1a$ adjacent the region to be welded. An anvil 3, one segment of which is illustrated, is assembled around the joint. Each segment is held in place, relative to adjacent segments or structure (not shown in FIGS. 1 to 6). The form of restraint is such that allows the segments of the anvil 3 to move away from the explosion only after the explosion has terminated as will be explained in greater detail hereinafter.

Figure 15:
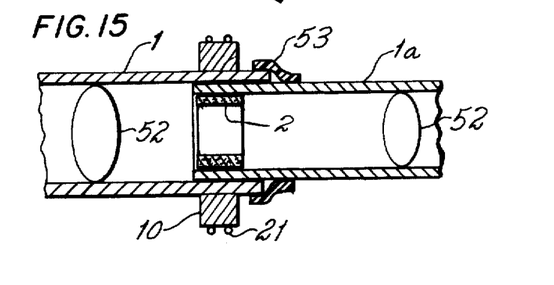
FIG. 15 is a schematic representation of an arrangement utilizinng the present invention for welding two pipe ends together in a liquid environment.
Figure 16:
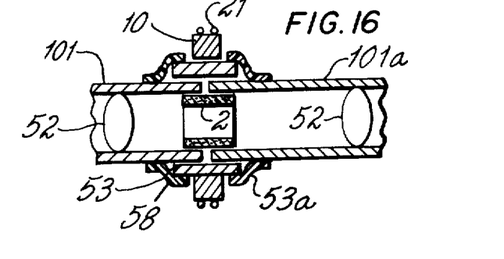
FIG. 16 is a schematic representation of an arrangement using the present invention for welding two pipe ends to a common external collar in a liquid environment.

Referring briefly to FIGS. 15 and 16, arrangements are shown for welding pipes together or to a common collar, respectively, in a liquid environment. Referring specifically to FIG. 15, the water is removed from the space within the pipe 1 and this space is then filled with air. To achieve this, sealing means such as inflatable bags 52 are positioned in the ends of pipes $1a$ and 1 at a region away from the explosive charge and the water is pumped out of the space between them. Air is fed into the space. To prevent the ingress of water into the join between pipes $1a$ and 1 or the egress of water therethrough, a sealing member, such as a rubber sleeve 53 is assembled inside or outside the pipes $1a$ and 1.

FIG. 16 is quite similar. Here the pipes 101 and $101a$ lie within a common collar 58 and are sealed by inflatable bags 52 and sealing members such as rubber sleeves 53 and $53a$.

The explosive charge 2 is detonated causing the end part of the pipe $1a$ to be accelerated towards pipe 1 and to impact with the pipe 1.

In the example of the welding of pipes as illustrated in FIGS. 1 to 6 the moving part of pipe $1a$ is forced into point contact with pipe 1 and the weld is completed by causing a rolling type of movement between pipes $1a$ and 1 as the tapered gap between the pipes $1a$ and 1 is closed.

Theoretically, the explosion produces a compression shock wave which radiates from the point of contact between pipes $1a$ and 1, and resultant rarefraction waves will be reflected from all surfaces of the anvil 3 (i.e. the side surfaces as well as the free surface 5. However, in practice the affect of the shock waves in a direction substantially parallel to the direction that the end of pipe $1a$ is moved by the explosion (i.e. in a radial direction) is far greater than the affect of the shockwaves travelling in other directions; so much so, in fact, that one could ignore the shock waves which do not travel radially outward when analysing the affect of the shock waves on the welding operation.

Furthermore, the compression shock wave that travels radially outward is not of uniform intensity. Also, because the explosive charge burns in an axial direction relative to the pipes $1a$ and 1, and since also the point of contact between the pipes $1a$ and 1 moves in an axial direction relative to the pipes $1a$ and 1, then the actual point of origin of the compressive shock wave that travels radially outwards tends to move in an axial direction relative to the pipes $1a$ and 1.

For simplicity in the following explanation when referring to the compression and rarefraction shock waves only the resultant of the wave fronts which move in radial directions will be considered.

At the commencement of the explosion, the wave front of a compression shock wave propagates radially through the wall of pipe $1a$, across the interface between the pipes $1a$ and 1 at the point of impact, and across the interface 4 between the pipe 1 and the anvil 3. The compression shock wave travels radially outward through the anvil 3 towards the free surface 5 of the anvil 3. The compression shock wave is indicated in FIG. 1 to 5 as a number of + signs.

Figure 2:
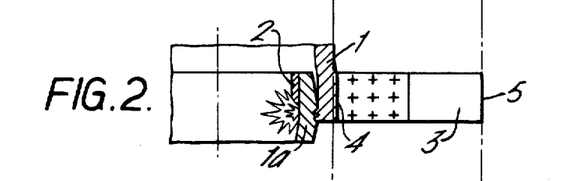
Figure 3:
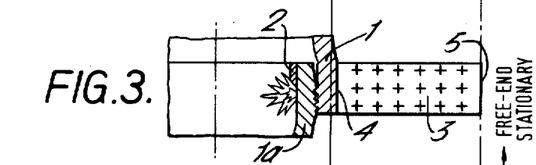
Figure 4:
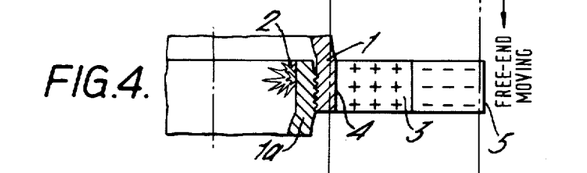
Figure 5:
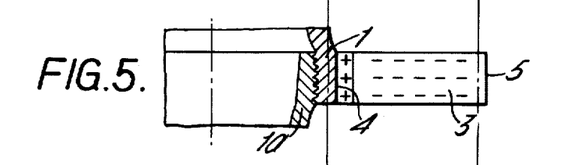
Figure 6:
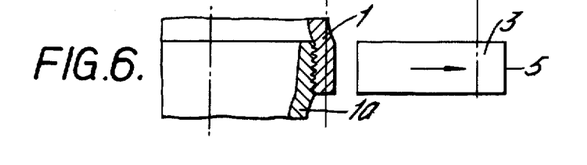

The explosive charge continues burning and the compression shock wave continues to travel towards the free surface 5 of the anvil as is shown in FIGS. 2 and 3. On reaching the free surface 5 of the anvil 3 (explosive charge, approximately ½ burnt), the segment is fully compressed elastically and the compression is relieved as a rarefraction wave or tensile wave (represented in the FIGS. 4 to 6 as a number of —signs). Up until the generation of the rarefraction shock wave the free surface 5 of anvil 3 remains stationary. At the occurance of the rarefraction shock wave, the free surface 5 of the anvil 3 moves in a direction away from the explosion and the anvil starts to expand elastically to its original size.

The rarefraction shock wave continues to travel back towards the interface 4 between the pipe 1 and the anvil 3 (FIG. 5) whilst the explosive charge is still burning. As soon as the rarefraction shock wave reaches the interface 4 (see FIG. 6) it is unable to propagate across the interface 4 and therefore the restraint holding the anvil 3 in place is overcome and the anvil is accelerated away from the pipe 1.

If the rarefraction shock wave reaches the interface 4 between pipe 1 and the anvil 3 before the explosive charge has burnt then the anvil 3 separates from the pipe 1 too soon and the pipes 1a and 1 may burst, the weld may be torn apart or, at the least, seriously distorted. The probable tearing of the weld would result because the interface 4 would immediately become a free surface for the reflection of the continuing compression wave travelling through the wall of pipe 1 as a rarefraction wave and the result would be for the pipe 1 to separate from pipe 1a when the rarefraction shock wave reached the interface between pipes 1a and 1.

The anvil 3 is so shaped and dimensioned that it remains in contact with the pipe 1 throughout the duration of the explosion to support the pipe against the forces generated by the explosion and thereafter is capable of being accelerated away from pipe 1 by the effect of the stored strain energy in the anvil. To achieve this, the dimension, $r$, of the anvil is sufficient to allow the compression shock wave to travel radially outward to the free surface 5 and for the resulting rarefraction shock wave to travel back to the interface 4 between the pipe 1 and the anvil 3 in a time not less than that required for the explosive to complete burning. The minimum dimension, $r$, is of course dependent on the velocity of sound in the material of the anvil, and is also dependent upon the time taken for the pipe 1a to be forced completely in contact with the pipe 1. A suitable value of $r$, is approximated by $$r = \frac{x}{2} \cdot \frac{Vs}{U_1}$$

where $x$ is the maximum distance between the first and second component prior to detonation of the explosive;

Vs is the velocity of sound through the anvil; and $U_1$ is the mean velocity of that part of the first component which is accelerated towards the second component prior to it impacting with the second component.

Theoretically one may consider the welding as occurring as two idealised events. Namely, firstly a free impact collision between the moving part of pipe 1a and the combination of pipe 1 and the anvil 3 during which momentum is conservatively transferred across the wall of pipe 1, and secondly an impulse reaction occuring between the welded pipes 1a and 1 which destroys the residual momentum of the moving part of pipe 1a and retains it stationary.

Considering the free impact collision, if $m_1$ = the mass of the moving part of pipe 1a $m_2$ = mass of the anvil $U_1$ = velocity of the moving part of pipe 1a before impact $V_1$ = velocity of the moving part of pipe 10 after impact.

$v_2$ = velocity of anvil after impact then $m_1 U_1 = m_1 V_1 + m_2 V_2$ the momentum of the moving part of pipe 1a is redistributed during the impact by a transfer of momentum to the anvil.

Now coefficient of restitution (ratio of relative velocities before and after impact), $$y = \frac{V_2 - V_1}{U_1}$$

so the velocities after a free impact would be:-

$$\text{Anvil } (V_2) = \frac{m_1 U_1 (1 + y)}{(m_1 + m_2)};$$

$$\text{moving part of Pipe 1a } (V_1) = \frac{U_1 (m_1 - m_2 y)}{(m_1 + m_2)}$$

The pipe 10 does not move with velocity $V_1$ after the impact because it is welded to pipe 1; so an impulse I, where $/I/ = m_1 V_1 /$, must be generated across the weld between the pipe 1a and the pipe 1 to destroy the residual momentum.

$$/I/ = \frac{/m_1 U_1 (m_1 - m_2 y)/}{(m_1 + m_2)}$$

Therefore,

If $m_1 > m_2 y$ the residual momentum of the flyer pipe 1a is positive (it tries to carry on) and the restraining impulse generated across the weld is compressive.

If $m_1 = m_2 y$ there is no impulse generated across the weld.

If $m_1 < m_2 y$ the residual momentum of the flyer pipe 1a is negative (it tries to rebound) and the restraining impulse generated across the weld is tensile.

In practice it is likely that $m_1$ is less than $m_2 y$ and there will exist a transient tensile impulse across the weld tending to destroy the recently-formed, still hot, weld.

The larger the ratio $m_2/m_1$ becomes, the larger the damaging impulse across the weld becomes. As $m_2/m_1$ increases, the tensile impulse tends towards y times the impulse delivered by the moving part of pipe 1a.

From other considerations it is likely that the ratio of $m_1$ to $m_2$ will be such that the tensile impulse will be present - but in order to minimise the impulse, the mass of the anvil should be minimised within the limits imposed by consideration of shock wave transmission times. A minimum-mass anvil will have the maximum take-off speed, so provision must be made for arresting it once its flight has begun.

When the welding act is completed, any residual energy should, ideally, be carried away by the anvil; because retention of free energy is potentially damaging to the weld. Thus for a given value of $y$, the kinetic energy of the departing anvil should be as large as possible.

$$K.E. \text{ of anvil on departure} = \tfrac{1}{2} m_2 V_2^2 = \frac{\tfrac{1}{2} m_2 m_1^2 U_1^2 (1 + y)^2}{(m_1 + m_2)^2}$$

This is a maximum when $m_1 = m_2$ (for any value of $y$).

Then the K.E. carried away $= 1/8 m_1 U_1^2 (1 + y)^2$
and the residual energy $= 1/8 m_1 U_1^2 (1 - y)^2$
So the energy "lost" during the impact which may be assumed to be used to perform thw work of forming the weld $= \frac{1}{4} m_1 U_1^2 (1 - y^2)$.

Thus, when the theoretical maximum energy is removed by the anvil, the residual energy is $$[ \frac{1}{2} \frac{(1-y)}{(1+y)} \text{ (the energy of formation of the weld)}]$$

As the ratio $m_2/m_1$ increases, the energy carried away by the anvil reduces and the free residual energy increases. This residual energy will be dissipated across the weld and should be minimised. But the mass of the anvil must be greater than that of the moving part of pipe $1a$, so in order to minimise the residual energy the mass of the anvil should be held as low as possible within the limits imposed by the required shock transmission times. However, the adverse effects incurred by increasing the mass ratio beyond the minimum become relatively less important as the coefficient of restitution decreases.

Figure 7:
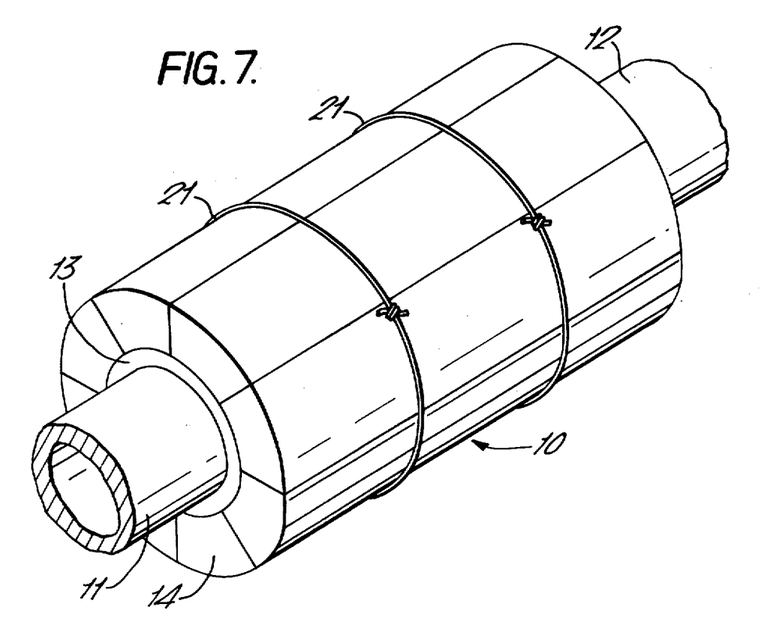
FIG. 7 illustrates one form of anvil in accordance with the present invention.

Referring to FIG. 7 an anvil for use in explosive welding of two butted pipes 11 and 12 to an external sleeve 13 which overlaps the butt joint between the pipes 11 and 12 is illustrated. An explosive is ignited in the bore of the pipes 11 and 12 to effect welding between the pipes 11, 12 and sleeve 13.

The anvil 10 comprises eight separable radially extending members 14 which are assembled around the pipes 11 and 12 and sleeve 13. Two wire bands 21, which constitute temporary constraining means for the members 14, are provided to ensure that the members 14 remain in plaace around the sleeve 13 throughout the duration of the explosion. The wire bands 21, are not strong enough to constrain completely movement of the members 14 and are intended to break to allow the members 14 to be accelerated away from the sleeve 13 by the release of the stored strain energy in the members 14 due to the explosion.

Figure 8:
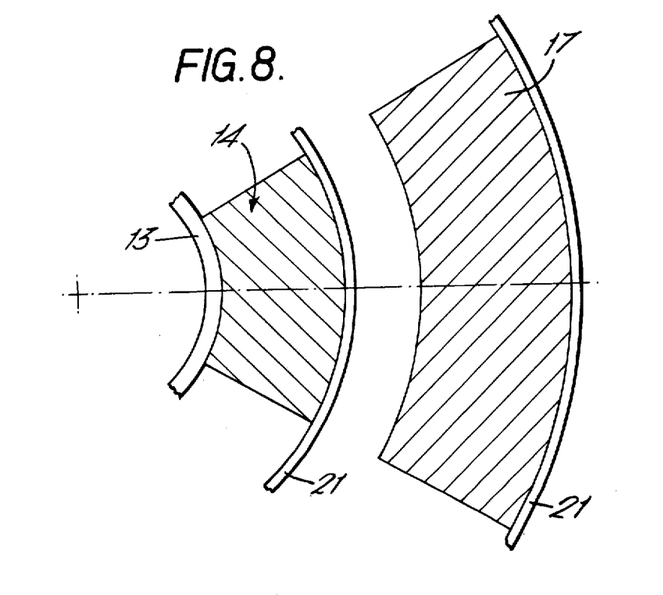
FIG. 8 illustrates the provision of a braking mass in the path of flight of each of the members of the anvil of FIG. 7.

One or more braking masses 17 (see FIG. 8) may be provided in the path of flight of each member 14 so that the respective member 14 collides with it to expend some of its own kinetic energy, and to impart movement to the braking mass 17 (i.e. resulting in high mass, low velocity, kinetic energy). Preferably the mass of the braking mass 17 is greater than that of member 14.

The effect of the brake mass may be examined by considering the following, in which:
suffix (2) refers to properties of the anvil,
suffix (3) refers to properties of the first brake-mass, and
suffix (4) refers to properties of the second brake-mass,
Velocities before the anvil to brake-mass (3) impact are given by U$b$;
velocities after the anvil to brake-mass (3) impact are given by V$a$; and
velocities after the combined anvil to brake-mass (4) impact are given by W. For a coefficient of restitution between the anvil and the first brake mass.

$$V_{a,3} = \frac{V_{a,3} - V_{a_2}}{Ub_2}; \quad Ub_3 = 0$$

$$V_{a_2} = \frac{Ub_2 (m_2 - m_3 y)}{m_2 + m_3}$$

$$V_{a_3} = \frac{Ub_2 m_2 (1 + y)}{m_2 + m_3}$$

Both $V_{a_2}$ and $V_{a_3}$ will be minimized if $y = 0$; the bodies then stick together and continue at a common speed Vc (a perfectly in-elastic impact).

$$\text{therefore } Vc = \frac{Ub_2 m_2}{m_2 + m_3}$$

If this combined anvil and brake-mass then strikes a second brake-mass ($m_4$) in an in-elastic manner the common speed of the anvil and both brake masses after impact $$Wc = \frac{m_2 + m_3}{m_2 + m_3 + m_4} \cdot Vc = \frac{m_2 Ub_2}{m_2 + m_3 + m_4}$$

which is the same as if the anvil had struck just one brake-mass of mass ($m_3 + m_4$) and stuck to it - instead of experiencing two impacts.

The effective size for the brake mass may be calculated as follows.

The anvil ($m_2$) travelling at U$b_2$ strikes a stationary ($Ub_3 = 0$) brake-mass ($m_3$). The impact is in-elastic, $y = 0$; the masses stick together and continue at a common speed Vc.

$$\text{since } Vc = \frac{Ub_2 m_2}{m_2 + m_3}$$

$$\text{if } m_3 = \xi \cdot m_2 \text{ then } Vc = \frac{1}{1 + \xi} \cdot Ub$$

The following table shows the affect of different braking mass.

| Value of mass | Speed Ratio | $(Vc/Ub_2)\%$ | Successive Reduction % |
|---|---|---|---|
| $\xi=1$ | $V_r =1/2 \cdot Ub_2$ | 50 | 50 |
| $\xi=2$ | $V_r =1/3 \cdot Ub_2$ | 33 | 17 |
| $\xi=3$ | $Vc =1/4 \cdot Ub_2$ | 25 | 8 |
| $\xi=4$ | $V_r =1/5 \cdot Ub_2$ | 20 | 5 |
| $\xi=5$ | $V_r =1/6 \cdot Ub_2$ | 17 | 3 |

The gains to be achieved diminish rapidly beyond $\xi = 3$.
The affect of different size braking mass is shown by the following illustration.

| | |
|---|---|
| Distance travelled vertically by anvil (in air) | $S = 45$m (without braking mass) |
| Using a brake of equal mass | $S = 11.3$m ($\xi=1$) |
| Using a brake of 2 × mass | $S = 5$m ($\xi=2$) |
| Using a brake of 3 × mass | $S = 2.8$m ($\xi=3$) |

Thus, allowing the anvil to strike a brake-mass of double its own mass reduces the distance travelled by "flying masses" by a factor $x$ 1/9; from 45m to 5m. This reduction is the same as would be achieved by trebling the mass of the anvil. But a minimum mass anvil with braking does not incur the increased reflection of energy produced by simply increasing the mass of the anvil.

Various devices may be used to loosely restrain the segments. For example frangible couplings, shear pins, elastic restraints in the form of, for example, rubber bands, magnetic clamps, wires, or adhesives could be used.

Figure 9:
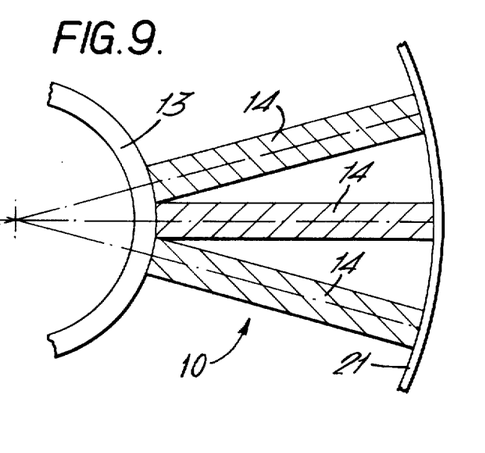
FIG. 9 to 13 illustrate one of the members of an alternative form of anvil to that of FIG. 7 in accordance with the present invention.

In an alternative form of anvil to that of FIG. 7, the anvil instead of being constructed of members which are a segment of a hollow cylindrical or solid annular form of anvil, as shown in FIG. 7, may be constructed as a thin sliver as illustrated in FIG. 9. Each member 14, (only three of which are shown), is held in place by a constraining means 21, which is a hoop or band of wire or rubber.

Figure 10:
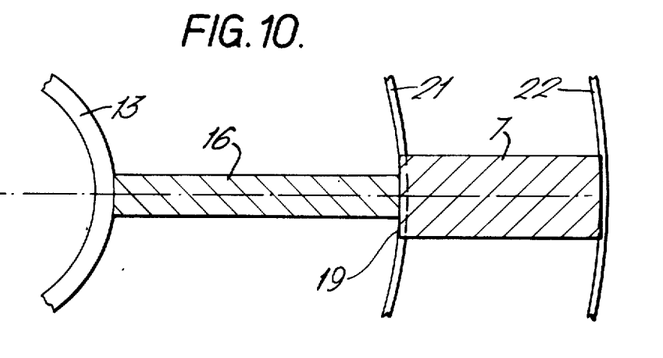

FIG. 10 shows one of the members of an anvil similar to that of FIG. 9.

From FIG. 10, each segment of the anvil 10 may be constructed from two abutting parts 16, 17, a first part which is a segment of an annulus the bore of which contacts the sleeve 13, and an outer part 7 which is a segment of a larger annulus the bore of which contacts the outer circumferential surface of the first part and the outer circumferential surface of which constitutes the aforementioned "free surface" of the anvil. Preferably the mass of the outer part 7 is larger than the mass of the inner part and the energy of the explosion is dissipated in two stages, firstly in separating the outer part 7 (high mass low velocity kinetic energy) when the rarefraction shock wave in the outer part 7 meets the interface 19 between the parts 16 and 7, then secondly in separating the inner part from the sleeve 13 (high velocity low mass kinetic energy). The inner and outer parts 16, 7 may be held in place by their own constraining means 21, 22 which may be bands of wire or rubber.

Figure 11:
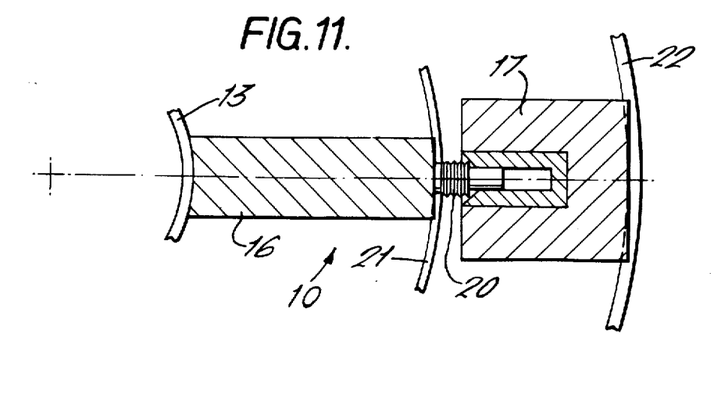

In an alternative form of anvil to that shown in FIGS. 9 or 10 the first part 16 may be provided with a broaching tool 20 which just contacts an outer part 17 which constitutes a braking mass as shown in FIG. 11. The extension of the part 16, during the time that the rarefraction shock wave travels from free end of the part 16 to the interface between the components to be welded and the member 16, does work on the outer part 17. A similar result may be achieved by locating shear pins in the path of the moving end of part 16 so that extension of part 16 progressively shears the pins.

Figure 12:
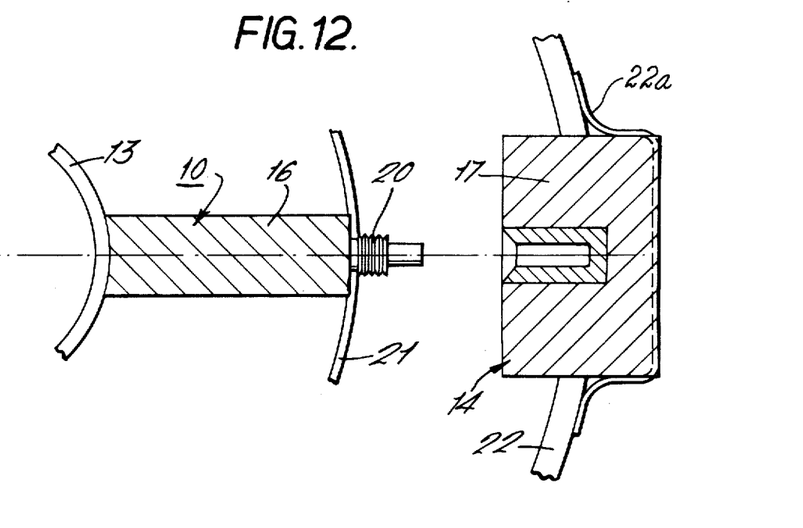

The outer part 17 may be held in contact with the anvil 10 (as shown in FIG. 11) by a constraining clamp 22, so that the work done on the part 17 is due to the extension of part 16 resulting from the rarefraction shock wave. Alternatively, as shown in FIG. 12, part 17 may be spaced from the anvil 10 by an annular constraining yoke 22a so that the work done is a result of impact and the change of kinetic energy of part 16.

Figure 13:
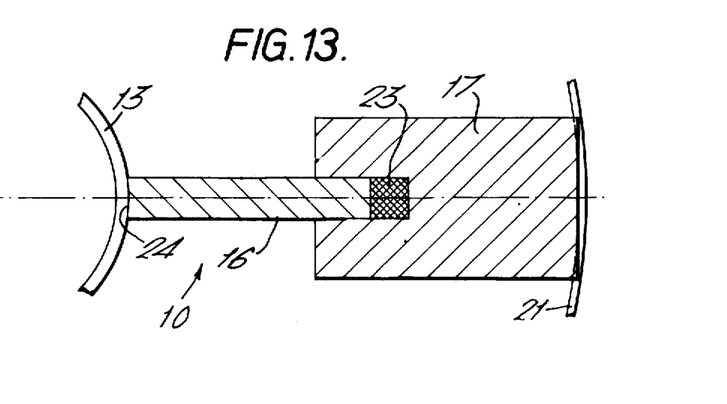

In yet a further arrangement, shown in FIG. 13, a resilient pad 23, or a medium which will not transmit appreciable compressive shock waves to the outer part 17, may be located between parts 16 of the anvil 10 and the outer part 17. The resilient pad 23 or medium would allow the part 17 to expand relative to part 16 during the rarefraction shock wave without causing a compression and rarefraction shock wave in the outer part 17. Only when the rarefraction shock wave reaches end 24 of member 16 would the member 16 separate from sleeve 13, and carry with it part 17.

The arrangements of FIGS. 8 to 13 enable a larger total mass to be used than the desirable minimum mass which is necessary to minimize the residual energy stored in the weld as explained above. The larger total mass would reduce the total distance that the member 14 travels after the explosion. The inner parts 16, are arranged to have the minimum mass necessary to withstand the shock waves.

Figure 14:
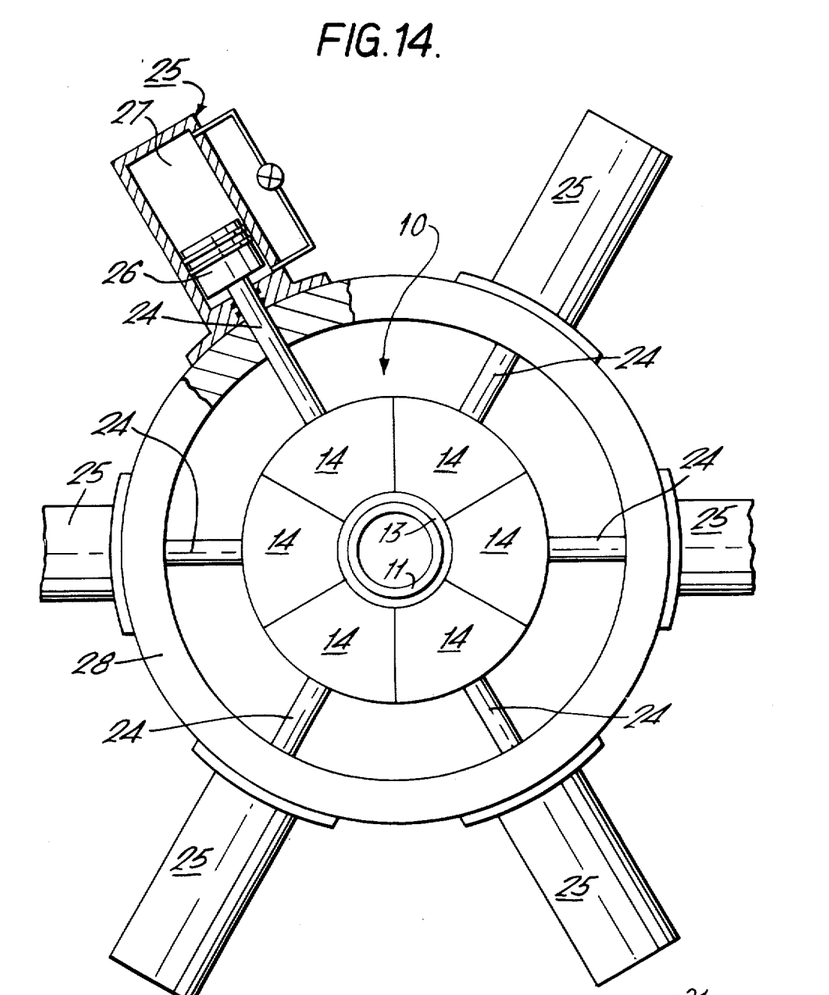
FIG. 14 illustrates an end view of a further alternative anvil to that of FIGS. 7 to 13 in accordance with the present invention.

In a further anvil, the members or 7 and/or the braking masses 17 (See FIGS. 8, 11, 12 or 13) may be further decelerated by means of an hydraulic or pneumatic shock absorber 25 as illustrated in FIG. 14.

Referring to FIG. 14, each member 14, (or braking mass 25) has connected to it a push-rod 24 which carries, at its free end a piston 26 operable in an hydraulic cylinder 27. Each shock absorber 25 is carried by an annular yoke 28 which is held stationary relative to the sleeve 13 in a fixed frame (not shown).

Radial outward movement of the members 14 is resisted by the hydraulic pressure in the cylinder 27. An adjustable pressure relief valve allows different degrees of damping to be obtained for different levels of explosion inside the pipes 11 and 12.

Whilst the anvil of FIG. 14 is most suitable for use in welding pipes in air, it may be used underwater. In the latter case the shock absorbers 25 could be further modified to displace water from within the cylinder 27 to the surrounding water through a relief valve or restricting orifice.

The shock absorbers could, in some instances, be replaced by springs or other resilient members and the yoke 28 could be constructed as a split housing which is rigidly bolted together prior to detonating the explosive.

In some circumstances the members 14 may be hollow and when used underwater they may be flooded with water prior to detonating the explosive.

It is not necessary for the anvil to extend in an axial direction beyond the length of area being welded since to do so would have the detrimental affect of increasing the mass of the anvil. It may be advantageous to construct the anvil in the form of an annular assembly in which the segmented anvil is sandwiched between two annular side plates which themselves could be segmented. In this arrangement the face between the anvil and the side plates may be arranged in a plane coincident with, or slightly beyond, the end of the weld region. In this way the anvil may separate from the side plates by sliding over the mating surfaces.

If desired, spoilers may be provided to slow down the anvil or parts of the anvil as it flies away from the pipe 11.

Other modifications may be made to the anvil without departing from the scope of the present invention.

I claim:

1. A method of welding a first component to a second component by accelerating it towards, and impacting it into, the second component, the method comprising the steps of locating an explosive charge adjacent the first component, positioning, adjacent the side of the second component that is remote from the first component, an anvil which is so shaped and dimensioned and of such mass that it supports the second component against the forces generated by the explosion, and is only accelerated away from the second component by the stored energy in the anvil after the weld between the first and second components is completed, and detonating the explosive charge.

2. A method of welding according to claim 1, wherein the anvil is constructed so that it has a dimension ($r$) from the interface between the anvil and the second component to a free surface of the anvil, measured in the direction extending away from the explosive charge which is sufficient to enable compression shock waves, produced by detonating the explosive charge, to travel from the interface to the free surface through the anvil and for resulting rarefraction shock waves, reflected from the free surface to travel back through the anvil to the interface in a time not less than it takes for the weld between the first and second components to be completed.

3. A method of welding according to claim 2, wherein the said dimension ($r$) is approximated by the formula $$r = \frac{x}{2} \cdot \frac{Vs}{U_1}$$

where
$x$ is the maximum distance between the first and second component immediately prior to detonation of the explosive charge;
$Vs$ is the velocity of sound through the anvil; and
$U_1$ is the velocity of that part of the first component, initially spaced the distance x from the second component that is accelerated towards, and impacts with, the second component; the velocity U, being the mean velocity immediately prior to impact calculated over the period taken for the weld between the first and second components to be completed.

4. A method of welding according to claim 3 wherein each segment of the anvil comprises a number of parts which are assembled in series proceeding away from the explosive charge.

5. A method of welding according to claim 1, wherein the anvil is an annular member constructed from a number of segments.

6. A method of welding according to claim 1, wherein the anvil comprises a number of parts which are assembled in series proceeding away from the explosive charge.

7. A method according to claim 6, wherein the parts assembled in series abut each other so that compression shock waves, produced by detonating the explosive charge, traverse the interfaces between the parts and continue in a direction away from the explosion.

8. A method according to claim 1, wherein braking means are provided to decelerate at least part of the anvil after it leaves the second component.

9. A method according to claim 8, wherein the braking means is one or more bodies with which at least part of the anvil collides.

10. A method according to claim 8, wherein the braking means is a fluid operated damper.

11. A method according to claim 8 wherein the braking means is a device which makes use of deformation of part of the device to absorb kinetic energy of the anvil.

12. A method according to claim 8, wherein the braking means is a broaching device, a part of which is carried by the anvil and a part of which is carried by a structure which is, at least initially, spaced from the anvil.

13. A method according to claim 8, wherein a resilient pad which does not transmit an appreciable compressive shock wave is located between the anvil and the braking means.

14. A method of welding according to claim 1, wherein temporary constraining means are provided for ensuring that the anvil remains to support the second component against the forces generated by the explosion during the welding of the components together but which permits the anvil to be accelerated away from the components by the stored strain energy in the anvil after the weld between the first and second components is completed.

15. A method of welding pipes in a liquid environment comprising the steps of positioning the pipes relative to each other and to a common external collar to enable them to be welded to the collar, locating an explosive charge inside the bores of the pipes in the vicinity of the collar, temporarily sealing the region to be welded and the bores of the pipes so as to reduce the ingression of the liquid into the bores of the pipes in the vicinity of the explosive charge, removing the liquid, at least from the region between each pipe and the collar, assembling around the outside of the collar an annular member which is made of a number of segments which extend radially a dimension ($r$) which is sufficient to enable compression shock waves, produced by detonating the explosive charge, to travel from the interface between the anvil and the collar through the anvil to the outer free surface of the anvil and for resulting rarefraction shock waves, reflected from the free surface, to travel back through the anvil to the interface in a time not less than it takes for the weld between each pipe and the collar to be completed, constraining the anvil to remain around the collar by means of a temporary constraining means which allows the anvil to be accelerated away from the collar by the stored strain energy in the anvil only after the weld between each pipe and the collar is completed and detonating the explosive charge to effect welding between each pipe and the collar.

16. A method according to claim 15, wherein the means for sealing the region to be welded are inflatable air bags.

17. A method according to claim 15 wherein the means for sealing the region to be welded are inflatable air bags.

18. Apparatus for use in a method of welding pipes in a liquid environment to form a fluid tight joint by welding a first component, including at least one of the pipes, outwardly to a second component by detonating an explosive charge adjacent the inside of the at least one pipe which includes the first component to accelerate at least part of the first component outwardly towards, and impacting it into, the second component, the apparatus comprising an anvil for location in contact with the side of the second component that is remote from the first component, a tempporary constraining means for holding the anvil in contact with the second component prior to and during the formation of the weld between the first and second components, and means for temporarily sealing the region to be welded and the bores of the pipes so as to reduce the ingression of liquid into the bores of the pipes in the vicinity of the explosive charge, the anvil being constructed so that it has a dimension ($r$) which in use extends in a direction outwardly from the explosive charge from the interface between the anvil and the second component to a surface of the anvil, which dimension ($r$) is sufficient to enable compression shock waves, produced by detonating the explosive charge, to travel through the anvil from the interface to the said surface of the anvil and for the resulting rarefraction shock wave, reflected from the said surface of the anvil, to travel back through the anvil to the interface in a time not less than it takes for the weld between the first and second components to be completed, and the contraining means being operable to release the anvil, thereby allowing the anvil to be accelerated away from the second component by the stored strained energy in the anvil, only after the weld between the first and second components is completed.

19. Apparatus according to claim 18 wherein braking means are provided to decelerate at least part of the anvil after it leaves the second component.

20. Apparatus according to claim 18 wherein the anvil is made of a plurality of separable members for assembly in contact with the second component.

21. Apparatus according to claim 18 wherein the dimension ($r$) is approximated by the formula $$r = \frac{x}{2} \cdot \frac{V_s}{U_1}$$

where
x is the maximum distance between the first and second components immediately prior to detonation of the explosive charge; Vs is the velocity of sound through the anvil; and
$U_1$ is the velocity of the part of the first component, initially spaced the distance x from the second component, that is accelerated towards, and impacts with, the second component; the velocity $U_1$ being the mean velocity immediately prior to impact calculated over the period taken for the weld between the first and seecond component to be completed.

22. Apparatus for use in a method of welding a first component to a second component by detonating an explosive charge adjacent the first component, the apparatus comprising an anvil for location in contact with the side of the second component that is remote from the first component, and a temporary constraining means for holding the anvil in contact with the second component prior to and during the formation of the weld between the first and second components the anvil being constructed so that it has a dimension ($r$) which in use extends in a direction outwardly from the explosive charge from the interface between the anvil and the second component to a surface of the anvil, which dimension ($r$) is sufficient to enable compression shock waves, produced by detonating the explosive charge, to travel through the anvil from the interface to the surface of the anvil and for the resulting rarefraction shock wave, reflected from the surface of the anvil, to travel back through the anvil to the interface in a time not less than it takes for the weld between the first and second components to be completed, and the constraining means being operable to release the anvil, thereby allowing the anvil to be accelerated away from the second component by the stored strain energy in the anvil, only after the weld between the first and second components is completed.

23. Apparatus according to claim 22 wherein the anvil is made of a plurality of separate members for assembly in contact with the second component.

24. Apparatus according to claim 22 wherein the dimension ($r$) is approximated by the formula $$r = \frac{x}{2} \cdot \frac{V_s}{U_1}$$

where
x is the maximum distance between the first and second components immediately prior to detonation of the explosive charge; Vs is the velocity of sound through the anvil; and
$U_1$ is the velocity of the part of the first component, initially spaced the distance x from the second component, that is accelerated toward, and impacts with, the second component; the velocity $U_1$ being the mean velocity immediately prior to impact calculated over the period taken for the weld between the first and second component to be completed.

25. Apparatus according to claim 22 wherein breaking means are provided to decelerate at least part of the anvil after it leaves the second component.

26. A method of welding pipes in a liquid environment comprising the steps of positioning the end of a first pipe inside the bore of a second pipe to enable them to be welded together, locating an explosive charge inside the bore of the first pipe, temporarily sealing the region to be welded and the bores of the pipes so as to reduce the ingression of the liquid into the bores of the pipe in the vicinity of the explosive charge, removing the liquid, at least from the region between the pipes, assembling around the outside of the pipes an annular anvil which is made of a number of segments which extend radially a dimension which is sufficient to enable compression shock waves, produced by detonating the explosive charge, to travel from the interface between the anvil and the second pipe to the outer free surface of the anvil through the anvil and for resulting rarefraction shock waves, reflected from the free surface, to travel back through the anvil to the interface in a time not less than it takes for the weld between the pipes to be completed, constraining the anvil to remain around the pipes by means of a temporary constraining means which allows the anvil to be accelerated away from the pipes by the stored strain energy in the anvil only after the weld between the pipes is completed and detonating the explosive charge to effect welding between the pipes.

27. A method according to claim 26, wherein the means for selaing the region to be welded are inflated air bags.

28. In a method of explosively forming a joint between first and second tubular members submerged in a liquid comprising the steps of assembling one end of the first member, one end of the second member, shock absorbing elements, internal and external seals and an explosive charge to form a jointing assembly, and thereafter detonating the explosive charge to effect jointing of the said ends of the tubular members, wherein the said assembling step includes the following steps carried out in any operative order, (a) arranging the said one end of the first member inside the said one end of the second member, (b) disposing an explosive charge within the said end of the first member, (c) disposing shock absorbing elements in the bores of the two members on opposite sides of the explosive charge, (d) arranging internal and external seals to form a sealed enclosure comprising at least the space between said ends, and (e) displacing liquid from said enclosure and replacing it with a gaseous medium, the improvement comprising:

positioning adjacent the outside of the second tubular member an anvil which is so shaped and dimensioned and of such mass that it supports the second tubular member against the forces generated by the explosion, and is only accelerated away from the second tubular member by the stored energy of the anvil after the weld between the first and second tubular members is completed.

* * * * *